United States Patent [19]

Cormio

[11] Patent Number: 4,554,589

[45] Date of Patent: Nov. 19, 1985

[54] PROCESS AND DEVICE ENSURING THE FIXATION ON THE NECK OF A CATHODE TUBE OF THE DEVIATION COLLAR OF THE TUBE

[75] Inventor: Ignazio Cormio, Montrouge, France

[73] Assignee: Videocolor S.A., Montrouge, France

[21] Appl. No.: 669,001

[22] Filed: Nov. 7, 1984

Related U.S. Application Data

[63] Continuation of Ser. No. 396,330, Jul. 8, 1982, Pat. No. 4,515,568.

[30] Foreign Application Priority Data

Jul. 9, 1981 [FR] France ................................ 81 13472

[51] Int. Cl.[4] ............................................ H04N 5/645

[52] U.S. Cl. .................................................... 358/248

[58] Field of Search .................... 358/248, 249; 445/3, 445/4, 63, 64; 335/212, 210

[56] References Cited

U.S. PATENT DOCUMENTS

| | | | |
|---|---|---|---|
| 2,840,740 | 6/1958 | Bickford | 358/248 |
| 3,497,843 | 2/1970 | Collie | 335/210 |
| 3,637,930 | 1/1972 | Meier | 358/248 |
| 4,060,836 | 11/1977 | Corbeij et al. | 335/212 |
| 4,261,017 | 4/1981 | Branton | 358/248 |
| 4,405,950 | 9/1983 | Wardell, Jr. | 358/248 |

*Primary Examiner*—John C. Martin
*Assistant Examiner*—Edward L. Coles
*Attorney, Agent, or Firm*—Oblon, Fisher, Spivak, McClelland & Maier

[57] ABSTRACT

The invention concerns a process and a device ensuring the fixation on the neck of a cathode tube of the deflection yoke of the tube. According to the invention, the deflection yoke 3 is fixed after its positioning has been determined between a fixed abutment 9 which may be adjustable in position and an elastic abutment 6 which presses the yoke 3 against the abutment 9. The invention applies especially to tubes adapted to be fitted to color television receiver appliances.

9 Claims, 3 Drawing Figures

PROCESS AND DEVICE ENSURING THE FIXATION ON THE NECK OF A CATHODE TUBE OF THE DEVIATION COLLAR OF THE TUBE

This is a continuation, of application Ser. No. 396,330, filed July 8, 1982, now U.S. Pat. No. 4,515,568.

FIELD OF THE INVENTION

The instant invention particularly relates to a process and a device that ensure the fixation on the neck of a cathode tube of the deflection yoke of the tube.

BACKGROUND OF THE INVENTION

It is known that in the manufacturing of cathode tubes especially adapted to be used on color television receiver appliances, the pre-adjustment of the deflection yoke on its tube is normally made within the plant, so as to obtain the best possible performance of the tube in the appliance.

Briefly, adjustment is either made by automatically or manually controlled machines, thus enabling determination of the optimal position of the deflection yoke on the neck of the tube in order to obtain the best possible image performance of the tube (especially purity of colors and deformations).

Once this adjustment of the yoke on the tube has been made, the yoke is fixed in the determined position. This fixation is usually carried out in one of the following ways:

a. a plastic ring is used which is stuck to the rear of the tube, and then the yoke is fixed, for example, by screws or by glue, onto this plastic ring, after correctly positioning it.

b. rubber wedges or quoins are used that are stuck onto the rear of the tube and onto the yoke, and the yoke is fixed onto the collar tube by metallic clamping means, after the collar has been correctly positioned.

c. mechanical clamping means are used such as screws or similar enabling fixation of the yoke on the tube or on the neck after positioning.

All these means are time-consuming and costly to apply.

According to another technique, reference shoes are provided on the rear of the tube that define the position of the yoke that has been fixed on the neck of the tube by metallic clamping means; this solution demands precision and, thereafter, higher manufacturing costs of the tubes, given that it does not permit a subsequent adjustment of positioning of the yoke.

SUMMARY OF THE INVENTION

The object of the instant invention is to provide an improved process and device allowing in a very simple, reliable and economic way, the obtaining of correct positioning of the yoke on a standard construction tube, after having determined the optimal position of the yoke on the tube in the manner employed with current standard machines.

According to the present process of fixation on the neck of a cathode tube of the deflection yoke of the tube mounted on the tube between a fixed stop or abutment whose position is adjustable, onto which is pressed the yoke after adjusting its position, and an elastic abutment fixed onto the tube, pressing and blocking the said yoke against the said adjustable fixed abutment. In this way, it is understood that after determining the most suitable position of the deviation collar on the tube, it is sufficient simply to fix as a rear stop the stop behind the yoke, the adjustable fixed abutment for example, by means of mechanical clamping means or gluing, the yoke thus being maintained automatically blocked in place between the adjustable fixed abutment that determines its position and the elastic abutment that maintains the yoke pressed against the adjustable fixed abutment. The operation is both efficient, rapid and economic.

The device according to the present invention ensuring the fixation of the neck of a cathode tube of the deflection yoke of the tube has an adjustable fixed abutment in position on the neck of the tube and an elastic abutment freely mounted on the neck of the tube of the other side of the said yoke with respect to a transversal median plane. Advantageously, the said elastic abutment is constituted by an elastic ring that is adjusted in a compressed or extended state between the rear face of the tube and the front face of the deviation collar once the device is in place.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF ONE EMBODIMENT OF THE INVENTION

Figure 1:
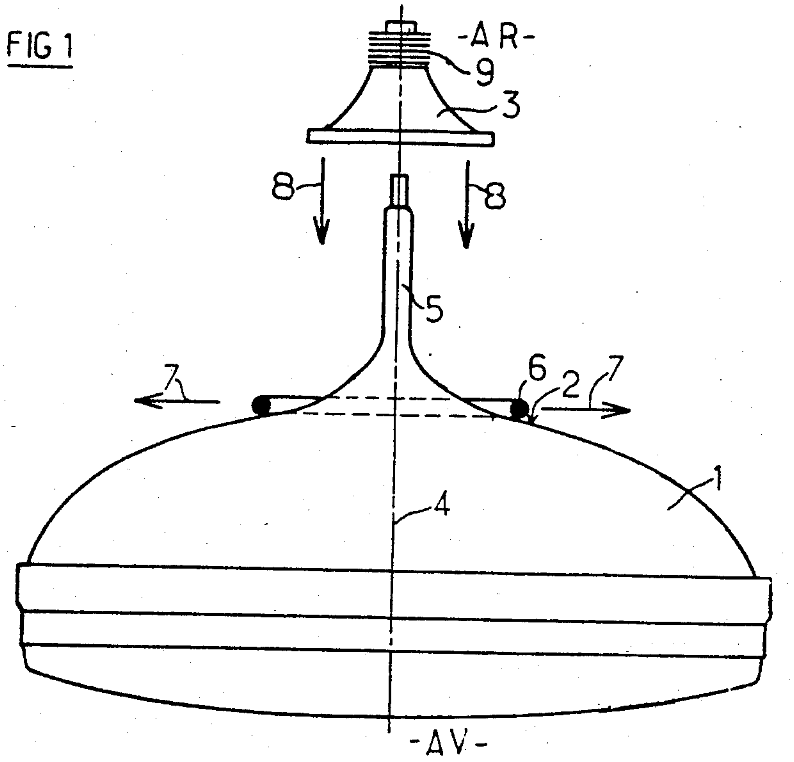
FIG. 1 schematically shows an exterior view of a cathode tube immediately prior to the positioning of the deflection yoke by using the means of the invention.

As shown in the drawings, it is desired to fix on the cathode tube 1 adjacent to its rear portion 2 the deflection yoke 3 of the tube. In the drawings, the references AV and AR indicate the directions, respectively in front of and behind the tube along its axis 4.

According to the embodiment shown, prior to the positioning of the yoke 3 that will be drawn onto the neck 5 of the tube, there is freely mounted against the rear face 2 of the tube an elastic abutment that is constituted 6 of the example shown by a ring, in rubber or similar material, maintained taut by any given means (not shown) of the positioning machine. In this way, and as shown schematically by arrows 7, the ring can be maintained in a substantially flattened position in a stretched state. In this position, ring 6 does not hinder the subsequent placing and positioning of yoke 3 that is drawn on the neck of the tube as shown by arrows 8.

Figure 2:
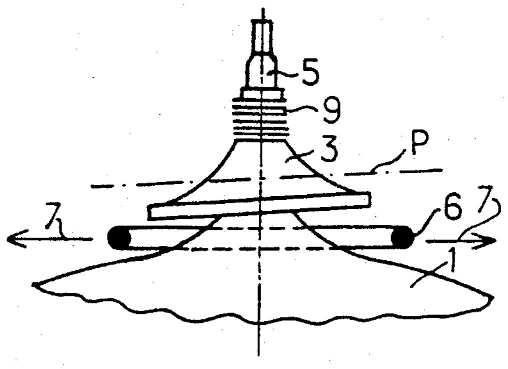
FIG. 2 shows on a larger scale and cut-away, the rear portion of the tube fitted with the deflection yoke brought into position but not yet blocked.

In the position shown in FIG. 2, the yoke 3 has been placed in its optimal position, i.e. in such a way as to give the best performance of tube 1. This position is determined in a standard manner. In these conditions, is applied behind collar 3 a fixed adjustable abutment 9 that can be constituted by any mechanical means such as, for example, a metallic clamping collar, which surrounds neck 5 of the tube. Abutment 9 can also be constituted by a washer, for example one formed of plastic, that will be stuck on neck 5 supported behind yoke 3.

Figure 3:
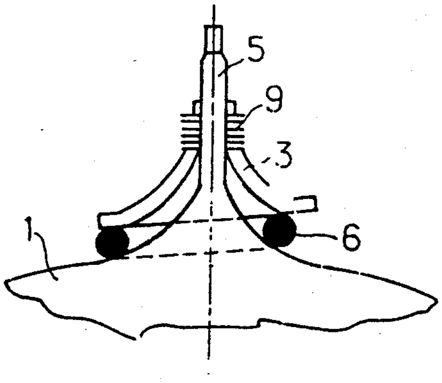
FIG. 3 shows, as in FIG. 2, the device after final elastic blocking.

In order to ensure the maintenance in place of the yoke 3 on the tube, it is thus sufficient to release the elastic ring which thus contracts (FIG. 3) and wedges between the rear wall of tube 1 and the front peripheral wall of the yoke 3, maintaining the device in place.

it will be noted that according to the invention, the placing and the maintenance of the yoke 3 are obtained very simply by maintenance of support of the yoke 3 against abutment 9 through the intermediary of an elastic abutment 6 placed on the other sie of the transversal median plane P of yoke 3 with respect to fixed abutment 9.

Of course, numerous variations can be made to the embodiment shown and described. Therefore, instead of using a flat ring having a single winding 6, a ring having several windings can be used, for example, one in the shape of a helicoidal spring, or any equivalent means, such as for example a cushion having appropriate elasticity and compressibility which is then placed in the rear portion 2 of the tube.

Eventually also, the structure can be reversed, the fixed abutment being placed towards the front of the yoke, and the elastic abutment being placed towards the rear, thus ncessitating, however, the provision of a supplemental blocking piece in order to stop this elastic abutment.

For the substance constituting ring 6, there advantageously can be used a silicone elastomer or any other substance having similar qualities of high-temperature stability, elasticity and mechanical resistance.

A typical material has the following characteristics:

Shore hardness: 50°

Breaking load: 75 kg/cm$^2$

Elongation at break: 400%

What is claimed as new and desired to be secured by Letters Patent of the United States is:

1. In a cathode tube having a deflection yoke, a device for ensuring the fixation of the deflection yoke on a neck of the tube, said device comprising an adjustable fixed abutment positioned on the neck of the tube on one side of said yoke with respect to a transverse median plane, and an elastic abutment freely mounted on the neck of the tube on the other side of the said yoke with respect to said transverse median plane.

2. Device according to claim 1, wherein the said adjustable fixed abutment is an abutment of the plastic washer kind which may be fixed by gluing on the neck of the tube.

3. Device according to claim 1, wherein the said elastic abutment is an elastic ring.

4. Device according to claim 3, wherein the said adjustable fixed abutment is an abutment of a metallic kind comprising clamping and blocking means on the neck of the tube.

5. Device according to claim 3, wherein the said adjustable fixed abutment is abutment of the plastic washer kind which may be fixed by gluing on the neck of the tube.

6. Device according to claim 3, wherein the said ring presses against the rear face of the tube.

7. Device according to claim 1, wherein the said adjustable fixed abutment is an abutment of a metallic king comprising clamping and blocking means on the neck of the tube.

8. Device according to claim 6, wherein the said adjustable fixed abutment is an abutment of a metallic kind comprising clamping and blocking means on the neck of the tube.

9. Device according to claim 6, wherein the said adjustable fixed abutment is abutment of the plastic washer kind which may be fixed by gluing on the neck of the tube.

* * * * *